United States Patent
Knuetter et al.

(10) Patent No.: US 8,190,586 B2
(45) Date of Patent: May 29, 2012

(54) METHOD AND SYSTEM FOR DETERMINING WHETHER AN ENTERED CHARACTER STRING CORRESPONDS TO TERMINOLOGY UTILIZED IN A DATABASE

(75) Inventors: Christian Knuetter, San Francisco, CA (US); Steven Lau, Belmont, CA (US); Sandy Ngo, San Francisco, CA (US); Gabe Correa, San Francisco, CA (US)

(73) Assignee: Stubhub, Inc., San Francisco, CA (US)

( * ) Notice: Subject to any disclaimer, the term of this patent is extended or adjusted under 35 U.S.C. 154(b) by 423 days.

(21) Appl. No.: 11/672,573

(22) Filed: Feb. 8, 2007

(65) Prior Publication Data

US 2008/0195580 A1    Aug. 14, 2008

(51) Int. Cl.
*G06F 7/00* (2006.01)
*G06F 17/00* (2006.01)
*G06F 17/30* (2006.01)

(52) U.S. Cl. ........................................ 707/694; 707/715

(58) Field of Classification Search ........................ None
See application file for complete search history.

(56) References Cited

U.S. PATENT DOCUMENTS

| 7,246,116 B2 * | 7/2007 | Barsness et al. ............. 707/714 |
| 2005/0197894 A1 * | 9/2005 | Fairbanks et al. ............. 705/14 |
| 2006/0123338 A1 * | 6/2006 | McCaffrey et al. ........... 715/531 |
| 2007/0124259 A1 * | 5/2007 | Sussman et al. .............. 705/400 |
| 2007/0208751 A1 * | 9/2007 | Cowan et al. .................... 707/10 |
| 2008/0204282 A1 * | 8/2008 | Jeon ................................. 341/22 |

* cited by examiner

*Primary Examiner* — Rehana Perveen
*Assistant Examiner* — Raheem Hoffler
(74) *Attorney, Agent, or Firm* — Haynes and Boone, LLP

(57) ABSTRACT

A method for determining whether an entered character string corresponds to terminology utilized in a catalogue database, comprising: accepting the entered character string; determining if the character string matches terminology utilized in the database; if the character string does not match terminology utilized in the database, applying at least one action to the character string to create an edited character string; and determining if the edited character string matches terminology utilized in the database.

20 Claims, 3 Drawing Sheets

METHOD AND SYSTEM FOR DETERMINING WHETHER AN ENTERED CHARACTER STRING CORRESPONDS TO TERMINOLOGY UTILIZED IN A DATABASE

DESCRIPTION OF EMBODIMENTS

In one embodiment, the system and method analyzes seller's listings and compares the listings to a pre-defined taxonomy to determine the proper locations for the listings. In one embodiment, the listings are ticket listings made up of a character string. Those of ordinary skill in the art will see that other types of listings can also be utilized, including any ecommerce item catalogues. For example, those of ordinary skill will see that several embodiments of the present invention can be used in various electronic catalogs where items entered are specific items that have to match up with a pre-defined catalog of items. Thus, several embodiments of the present invention can be used to catalogue any item or service (clothing, electronics, automobiles, tickets) that has attributes (e.g., size, color, style, feature set), which attributes set the item or service apart from other items or services in its family (e.g., megapixels for cameras, section # for tickets). In the case of ticket listings, the system and method analyzes data in the character string (e.g., section and/or row information) provided by the seller. The character string is edited and analyzed utilizing a pre-defined set of rules relating to the venue taxonomy that describes the layout for the venue. In one embodiment, a separate catalogue database can be created for each venue or type of venue. In another embodiment, a catalogue database combining many types of venues can be utilized. In one embodiment, the character string is attempted to be matched to a particular section in the catalogue database before and after each type of editing and analyzing.

Figure 1:
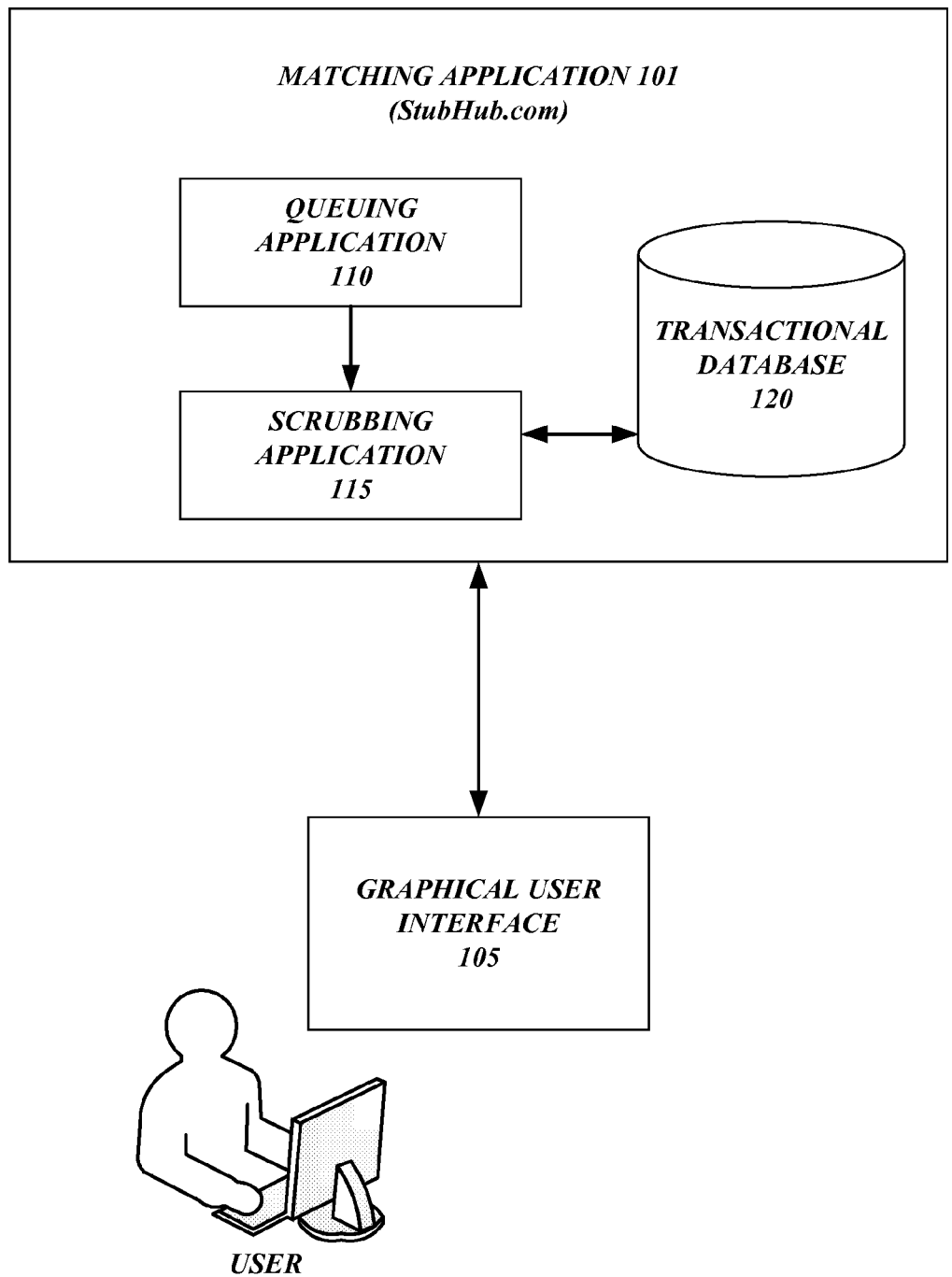
FIG. 1 illustrates a system for determining whether an entered character string corresponds to terminology utilized in a catalogue database, according to one embodiment.

FIG. 1 illustrates a system 100 for determining whether an entered character string corresponds to terminology utilized in a catalogue database, according to one embodiment. Matching application 101 includes a queuing application 110 and a scrubbing application 115. The queuing application takes all of the input strings and queues them for processing based on priority. A priority is defined based on pre-defined rules such as who entered the listing, what process caused the listing to be sent to the scrubbing application 115, etc. The scrubbing application 115 runs the character string through a pre-defined set of rules and compares the character string to data in the transactional database 120 (e.g., a catalogue database). The user interface 105 communicates with the matching application 101 to provide the character string to the matching application 101 so that the character string can be edited and analyzed. As users of the user interface 105 often do not use consistent terminology when describing their tickets, the matching application 101 allows these users to list tickets in a non-restrictive way, and is able to display the listed tickets consistently so that like tickets can be accurately compared. In one embodiment, the user of the user interface 105 is able to view the resulting edited and analyzed character string. In another embodiment, the edited and analyzed character string is not shown to the user of the user interface 105.

Figure 2:
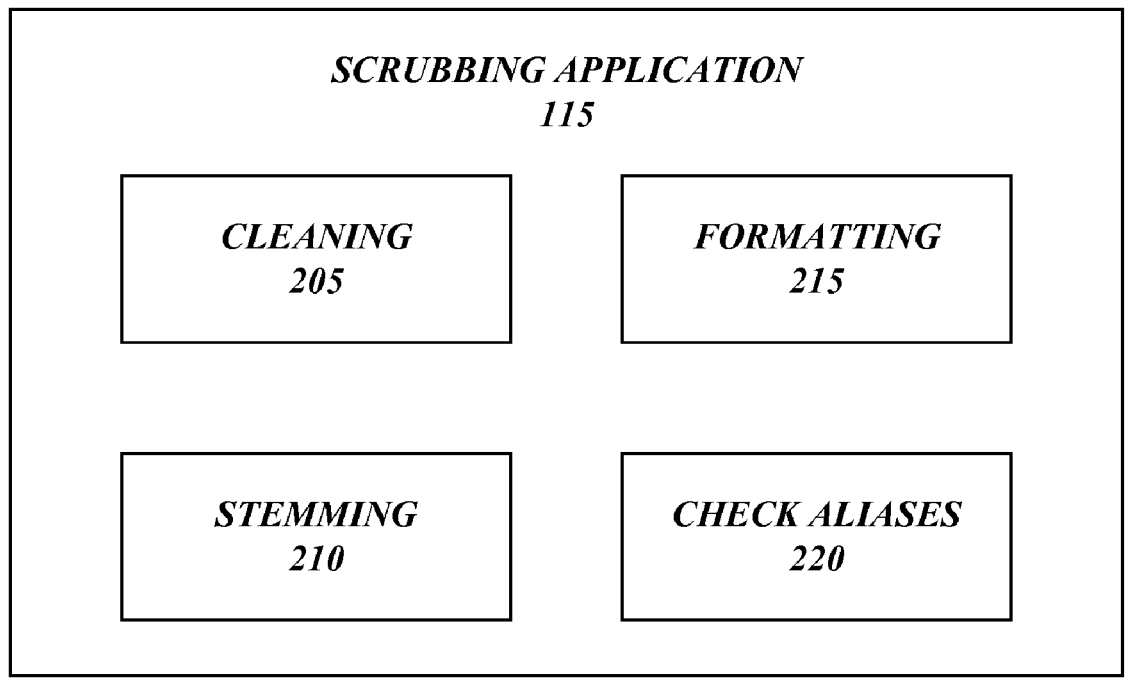
FIG. 2 illustrates components of a scrubbing application, according to one embodiment.

FIG. 2 illustrates components of a scrubbing application, according to one embodiment. The scrubbing application 115 includes a cleaning application 205, a stemming application 210, a formatting application 215, and an alias application 220. The cleaning application 205 cleans up the character string. In one embodiment, this is done by removing non-alpha-numeric characters, and making sure the spacing between letters and numbers is standardized. Thus, for example, the character string "5% Sec" could be cleaned to remove the "%" character, so that the character string becomes "5 Sec" In one embodiment, standardized spacing could include adding spacing between letters and numbers, and also reducing all spacing to a standardized space, such as one space. Thus, for example, the character string "5  Sec" could be changed to "5 Sec". The stemming application 210 applies stems to the character string. In one embodiment, this is done by changing recognized abbreviated words to full words, and/or changing full words to standard abbreviations. Thus, for example, the character string "5 Sec" could be changed to "5 Section". The formatting application 215 formats the character string to a standardized format. In one embodiment, the first number can be moved to the first or last position in the character string. This is done so that the character strings are in a consistent format. Thus, for example, the character string "5 Section" could be changed to "Section 5". The alias application 220 checks the character string for aliases. In one embodiment, the character string is checked to determine the existence of an alias for the string in the section taxonomy. For example, "section" could be searched and the alias "group" could be found.

Figure 3:
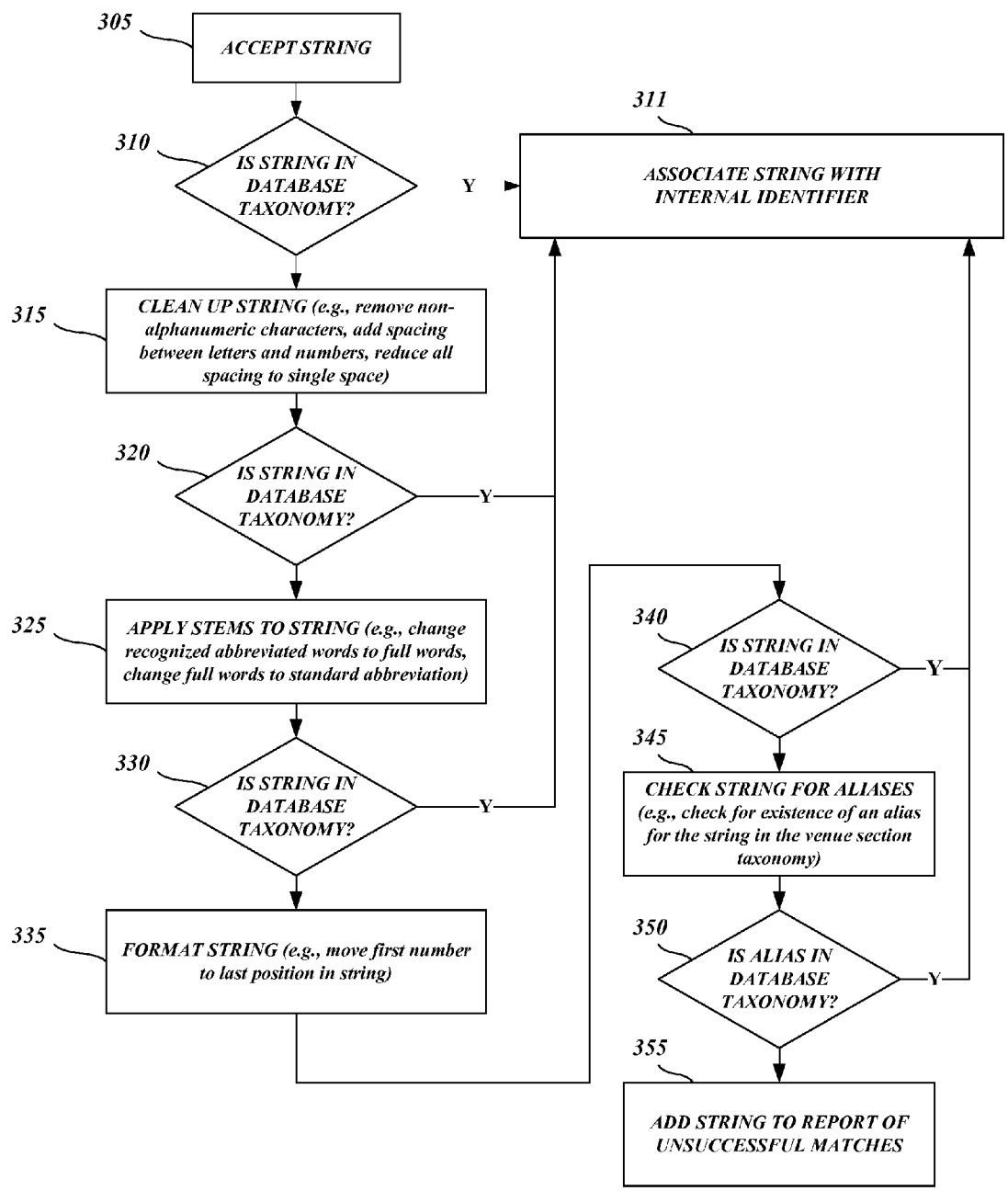
FIG. 3 illustrates a method for determining whether an entered character string corresponds to terminology utilized in a catalogue database, according to one embodiment.

FIG. 3 illustrates a method for determining whether an entered character string corresponds to terminology utilized in a catalogue database, according to one embodiment. In 305 a character string is accepted. For example, "5% Sec" could be accepted. In 310 it is determined if the character string is in the database taxonomy. If yes, in the 311 the character string is associated with the internal identifier (for example, "Section A217" with consistent internal terminology "Section A217" or with internal number "27459"). If the character string is not in the database taxonomy, in 315 the character string is cleaned up. For example, non-alphanumeric characters are removed, spacing between letters and numbers is added, and all spacing is reduced to single space. Thus, for example, "5% Sec" could be changed to "5 Sec". In 320 it is again determined if the character string is in the database taxonomy. If yes, the process moves to 311 as before. If no, in 325 stems are applied to the character string. Thus, for example recognized abbreviated words are changed to full words, and full words are changed to standard abbreviations. For example, "5 Sec" could be changed to "5 Section". In 330 it is again determined if the character string is in the database taxonomy. If yes, the process moves to 311 as before. If no, in 335 the character string is formatted. For example, the first number can be moved to the last position in the character string, the last number can be moved to the first position in the character string, or any other movement can be made. For example, "5 Section" could be changed to "Section 5". In 340, it is again determined if the character string is in the database taxonomy. If yes, the process moves to 311 as described above. If no, in 345 the character string is checked for aliases. Thus, for example, the existence of an alias for the character string is checked in the venue section taxonomy. Say that in one venue, groups are used instead of sections. In this case, "Section" could be searched, and the alias "Group" could be found. "Section 305 could then be replaced with "Group 305". In 350, it is again determined if the character string is in the database taxonomy. If yes, the process moves to 311 as described above. If no, the character string is added to a report of unsuccessful matches. This report is then reviewed (either manually or electronically) to determine which of the cleaning, stemming, formatting and/or alias applications must be modified to capture any additional generic terms. Those of ordinary skill in the art will see that the cleaning, stemming, formatting, and/or alias applications can be applied in any order. In addition, those of ordinary skill in the art will see that any combination of the cleaning, stemming, formatting and/or alias application, with or without additional applications, can be utilized.

While various embodiments have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

In addition, it should be understood that the figures, which highlight the functionality and advantages of the present invention, are presented for example purposes only. The architecture of the present invention is sufficiently flexible and configurable, such that it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

What is claimed is:

1. A computer-implemented method comprising:
    storing, in a database, a predefined catalog of venue attributes describing sections of a venue utilized for comparing tickets for the venue that are listed for sale in the database, wherein one or more ticket attributes of a ticket provided by a seller must match a venue attribute in the predefined catalog in order to display a ticket listing for offering the ticket provided by the seller for sale to other users;
    presenting a graphical user interface to a computer of the seller for receiving a character string representing one or more ticket attributes of a ticket provided by the seller;
    accepting the character string as entered by the seller;
    comparing the character string as entered by the seller to the predefined catalog of venue attributes stored in the database;
    determining if the character string as entered by the seller corresponds to terminology for venue attributes utilized by the predefined catalog in the database for comparing tickets for the venue that are listed for sale in the database;
    if the character string as entered by the seller does not correspond to terminology for venue attributes utilized by the predefined catalog in the database for comparing tickets for the venue that are listed for sale in the database applying an initial rule in a set of pre-defined rules to the character string to edit the character string prior to reporting an unsuccessful match; and after applying the initial rule:
        determining if the character string corresponds to terminology for venue attributes utilized by the predefined catalog in the database for comparing tickets for the venue that are listed for sale in the database after applying the initial rule;
        if the character string does not correspond to the terminology for venue attributes utilized by the predefined catalog in the database for comparing tickets for the venue that are listed for sale in the database, applying one or more subsequent rules in the set of pre-defined rules to further modify the character string and determining whether the character string corresponds to the terminology for venue attributes utilized by the predefined catalog in the database for comparing tickets for the venue that are listed for sale in the database after applying each subsequent rule; and
        if all of the pre-defined rules have been applied and it was never determined that the character string corresponds to the terminology for venue attributes utilized by the predefined catalog in the database for comparing tickets for the venue that are listed for sale in the database, then reporting an unsuccessful match; and
    if the character string as entered or as modified by any one or more of the pre-defined rules corresponds to the terminology for venue attributes utilized by the predefined catalog in the database for comparing tickets for the venue that are listed for sale in the database:
        associating the character string with an identifier corresponding to a venue attribute utilized by the predefined catalog in the database for comparing tickets for the venue that are listed for sale that corresponds to the character string of the ticket provided by the seller; and
        determining a location for displaying the ticket listing for offering the ticket provided by the seller for sale to other users with ticket listings of like tickets that have been provided by other sellers and are listed for sale in the database.

2. The method of claim 1, wherein the set of pre-defined rules comprises:
    cleaning the character string, the cleaning comprising performing one or more of removing non-alphanumeric characters, removing unidentified characters, adding spacing between letters and numbers, and reducing spacing between characters to a single space.

3. The method of claim 1, wherein the set of pre-defined rules comprises:
    stemming the character string, the stemming comprising performing one or more of changing recognized abbreviated words to their non-abbreviated forms and changing non-abbreviated forms to their recognized abbreviated forms.

4. The method of claim 1, wherein the set of pre-defined rules comprises:
    formatting the character string, the formatting comprising moving around characters in the character string so that their position complies with a pre-determined format.

5. The method of claim 1, wherein the set of pre-defined rules comprises:
    checking the character string for an alias, the alias being a word that is an alternative or equivalent word for a word or partial word in the character string.

6. The method of claim 1, further comprising:
updating the character string with an internal identifier of a section of the venue utilized in the database if the character string corresponds to terminology for venue attributes utilized by the predefined catalog in the database for comparing tickets for the venue that are listed for sale in the database.

7. The method of claim 1, further comprising:
if it was never determined that the character string corresponds to terminology for venue attributes utilized by the predefined catalog in the database for comparing tickets for the venue that are listed for sale in the database, updating the terminology for venue attributes utilized by the predefined catalog in the database for comparing tickets for the venue that are listed for sale in the database to include the character string or an alternate version of the character string.

8. A computer-implemented system comprising a computing device having a database storing a predefined catalog of venue attributes describing sections of a venue utilized for comparing tickets for the venue that are listed for sale in the database, wherein one or more ticket attributes of a ticket provided by a seller must match a venue attribute in the predefined catalog in order to display a ticket listing for offering the ticket provided by the seller to other users and executing an application for:
presenting a graphical user interface to a computer of the seller for receiving a character string representing one or more ticket attributes of a ticket provided by the seller;
accepting the character string as entered by the seller;
comparing the character string as entered by the seller to the predefined catalog of venue attributes stored in the database;
determining if the character string as entered by the seller corresponds to terminology for venue attributes utilized by the predefined catalog in the database for comparing tickets for the venue that are listed for sale in the database;
if the character string as entered by the seller does not correspond to terminology for venue attributes utilized by the predefined catalog in the database for comparing tickets for the venue that are listed for sale in the database applying an initial rule in a set of pre-defined rules to the character string to edit the character string prior to reporting an unsuccessful match; and after applying the initial rule:
determining if the character string corresponds to terminology for venue attributes utilized by the predefined catalog in the database for comparing tickets for the venue that are listed for sale in the database after applying the initial rule;
if the character string does not correspond to the terminology for venue attributes utilized by the predefined catalog in the database for comparing tickets for the venue that are listed for sale in the database, applying one or more subsequent rules in the set of pre-defined rules to further modify the character string and determining whether the character string corresponds to the terminology for venue attributes utilized by the predefined catalog in the database for comparing tickets for the venue that are listed for sale in the database after applying each subsequent rule; and
if all of the pre-defined rules have been applied and it was never determined that the character string corresponds to the terminology for venue attributes utilized by the predefined catalog in the database for comparing tickets for the venue that are listed for sale in the database, then reporting an unsuccessful match; and
if the character string as entered or as modified by any one or more of the pre-defined rules corresponds to the terminology for venue attributes utilized by the predefined catalog in the database for comparing tickets for the venue that are listed for sale in the database:
associating the character string with an identifier corresponding to a venue attribute utilized by the predefined catalog in the database for comparing tickets for the venue that are listed for sale that corresponds to the character string of the ticket provided by the seller; and
determining a location for displaying the ticket listing for offering the ticket provided by the seller for sale to other users with ticket listings of like tickets that have been provided by other sellers and are listed for sale in the database.

9. The system of claim 8, wherein the set of pre-defined rules comprises:
cleaning the character string, the cleaning comprising performing one or more of removing non-alphanumeric characters, removing unidentified characters, adding spacing between letters and numbers, and reducing spacing between characters to a single space.

10. The system of claim 8, wherein the set of pre-defined rules comprises:
stemming the character string, the stemming comprising performing one or more of changing recognized abbreviated words to their non-abbreviated forms and changing non-abbreviated forms to their recognized abbreviated forms.

11. The system of claim 8, wherein the set of pre-defined rules comprises:
formatting the character string, the formatting comprising moving around characters in the character string so that their position complies with a pre-determined format.

12. The system of claim 8, wherein the set of pre-defined rules comprises:
checking the character string for an alias, the alias being a word that is an alternative or equivalent word for a word or partial word in the character string.

13. The system of claim 8, wherein if the character string corresponds to terminology for venue attributes utilized by the predefined catalog in the database for comparing tickets for the venue that are listed for sale in the database, the application updates the character string with an internal identifier of a section of the venue utilized in the database.

14. The system of claim 8, wherein if the character string does not correspond to terminology for venue attributes utilized by the predefined catalog in the database for comparing tickets for the venue that are listed for sale in the database, the application updates the terminology for venue attributes utilized by the predefined catalog in the database for comparing tickets for the venue that are listed for sale in the database to include the character string or an alternate version of the character string.

15. A computer-implemented method for displaying ticket listings comprising:
storing, in a database, a predefined catalog of venue attributes describing sections of a venue utilized for comparing tickets for the venue that are listed for sale in the database, wherein one or more ticket attributes of a ticket provided by a seller must match a venue attribute in the predefined catalog in order to display a ticket listing for offering the ticket provided by the seller to other users;

presenting a graphical user interface to a computer of the seller for receiving a character string representing one or more ticket attributes of a ticket provided by the seller;

accepting the character string as entered by the seller;

comparing the character string as entered by the seller to the predefined catalog of venue attributes stored in the database;

determining if the character string as entered by the seller corresponds to a venue section taxonomy for venue attributes utilized by the predefined catalog in the database for comparing tickets for the venue that are listed for sale in the database;

in the event that the character string as entered by the seller does not correspond to the venue section taxonomy for venue attributes utilized by the predefined catalog in the database for comparing tickets for the venue that are listed for sale in the database applying an initial rule in a sequence of pre-defined rules relating to the venue section taxonomy to edit the character string prior to reporting an unsuccessful match; and after applying the initial rule:

determining whether the character string corresponds to the venue section taxonomy for venue attributes utilized by the predefined catalog in the database for comparing tickets for the venue that are listed for sale in the database after applying the initial rule;

if the character string does not correspond to the venue section taxonomy for venue attributes utilized by the predefined catalog in the database for comparing tickets for the venue that are listed for sale in the database, applying one or more subsequent rules in the sequence of pre-defined rules relating to the venue section taxonomy to further modify the character string and determining whether the character string corresponds to the venue section taxonomy for venue attributes utilized by the predefined catalog in the database for comparing tickets for the venue that are listed for sale in the database after applying each subsequent rule; and if all of the pre-defined rules have been applied and it was never determined that the character string corresponds to the venue section taxonomy for venue attributes utilized by the predefined catalog in the database for comparing tickets for the venue that are listed for sale in the database, then reporting an unsuccessful match; and if the character string as entered or as modified by any one or more of the pre-defined rules corresponds to the venue section taxonomy for venue attributes utilized by the predefined catalog in the database for comparing tickets for the venue that are listed for sale in the database:

associating the ticket provided by the seller with an identifier corresponding to a section in the venue described by the predefined catalog of venue attributes stored in the database; and determining a location for displaying the ticket listing for offering the ticket provided by the seller for sale to other users with ticket listings of other tickets in the section that have been provided by other sellers and are listed for sale in the database.

16. The method of claim 15, wherein the sequence of pre-defined rules comprises:

cleaning the character string by performing one or more of removing non-alphanumeric characters, removing unidentified characters, adding spacing between letters and numbers, and reducing spacing between characters to a single space;

stemming the character string by performing one or more of changing recognized abbreviated words to non-abbreviated forms and changing non-abbreviated forms to recognized abbreviated forms;

formatting the character string by repositioning characters within the character string; and checking for an alias of an attribute represented by the character string.

17. The method of claim 15, further comprising:

updating the venue section taxonomy for venue attributes utilized by the predefined catalog in the database for comparing tickets for the venue that are listed for sale in the database in the event that it was never determined that the character string corresponds to the venue section taxonomy for venue attributes utilized by the predefined catalog in the database for comparing tickets for the venue that are listed for sale in the database.

18. The method of claim 15, further comprising queuing the ticket listing of the ticket provided by the seller for processing based on priority.

19. The method of claim 15, further comprising:

displaying the ticket listing of the ticket provided by the seller to allow the seller to edit the ticket listing after it is determined that the character string corresponds to the venue section taxonomy.

20. The method of claim 15, further comprising:

displaying the ticket listing of the ticket provided by the seller in a format consistent with the ticket listings of the other sellers that are listed for sale in the database after it is determined that the character string corresponds to the venue section taxonomy.

* * * * *